(12) United States Patent
Mullins et al.

(10) Patent No.: US 8,413,427 B2
(45) Date of Patent: Apr. 9, 2013

(54) DOSING CONTROL SYSTEMS AND METHODS

(75) Inventors: Jason Daniel Mullins, Brighton, MI (US); Justin A. Shetney, Livonia, MI (US); Kyle E. Crawford, Howell, MI (US); Paul Jasinkiewicz, Northville, MI (US); Rebecca J Darr, Milford, MI (US)

(73) Assignee: GM Global Technology Operations LLC

( * ) Notice: Subject to any disclaimer, the term of this patent is extended or adjusted under 35 U.S.C. 154(b) by 303 days.

(21) Appl. No.: 12/796,062

(22) Filed: Jun. 8, 2010

(65) Prior Publication Data

US 2011/0047971 A1 Mar. 3, 2011

Related U.S. Application Data

(60) Provisional application No. 61/236,664, filed on Aug. 25, 2009.

(51) Int. Cl.
*F01N 3/20* (2006.01)

(52) U.S. Cl.
USPC ............... 60/286; 60/274; 60/287; 60/295; 60/297; 60/298; 60/301; 60/303; 60/311

(58) Field of Classification Search .......... 60/274, 60/286, 287, 295, 297, 298, 299, 301, 303, 60/311
See application file for complete search history.

(56) References Cited

U.S. PATENT DOCUMENTS

| 2009/0120068 A1* | 5/2009 | Sakimoto et al. | 60/285 |
| 2009/0165442 A1* | 7/2009 | Hara | 60/286 |
| 2009/0288395 A1* | 11/2009 | Haeberer et al. | 60/286 |
| 2010/0011748 A1* | 1/2010 | Yokota | 60/286 |
| 2010/0031639 A1* | 2/2010 | Kwon | 60/286 |
| 2010/0154385 A1* | 6/2010 | Perrin et al. | 60/274 |
| 2010/0242439 A1* | 9/2010 | Domon et al. | 60/274 |

FOREIGN PATENT DOCUMENTS

| WO | WO2008058896 A1 | 5/2008 |
| WO | WO 2009050948 A1 * | 4/2009 |

OTHER PUBLICATIONS

U.S. Appl. No. 12/826,872, filed Jun. 30, 2010, Mullins et al.

* cited by examiner

*Primary Examiner* — Thomas Denion
*Assistant Examiner* — Jorge Leon, Jr.

(57) ABSTRACT

A dosing control system for a vehicle includes a pump control module and an enabling/disabling module. The pump control module controls a pump that provides dosing agent to a dosing agent injector located upstream of a selective catalytic reduction (SCR) catalyst in an exhaust system. The enabling/disabling module disables the pump for a predetermined melting period after engine startup when the dosing agent is frozen and selectively activates the pump during the predetermined melting period to cool the dosing agent injector when a tip temperature of the dosing agent injector is greater than a predetermined temperature.

21 Claims, 3 Drawing Sheets

DOSING CONTROL SYSTEMS AND METHODS

CROSS-REFERENCE TO RELATED APPLICATIONS

This application claims the benefit of U.S. Provisional Application No. 61/236,664, filed on Aug. 25, 2009. The disclosure of the above application is incorporated herein by reference in its entirety.

FIELD

The present disclosure relates to internal combustion engines and more particularly to exhaust treatment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture to produce drive torque. Air is drawn into an engine through an intake manifold. A throttle valve controls airflow into the engine. The air mixes with fuel injected by one or more fuel injectors to form the air/fuel mixture. The air/fuel mixture is combusted within one or more cylinders of the engine. Combustion of the air/fuel mixture generates drive torque.

Exhaust resulting from the combustion of the air/fuel mixture includes particulate matter (PM) and exhaust gas. The exhaust gas includes nitrogen oxides (NOx), such as nitrogen monoxide (NO) and nitrogen dioxide ($NO_2$). The PM may include hydrocarbons and carbon oxides. The exhaust is expelled from the engine to an exhaust system that includes a treatment system. The treatment system reduces the amounts of NOx and PM in the exhaust.

The treatment system includes an oxidation catalyst (OC), a dosing agent injector, a selective catalytic reduction (SCR) catalyst, and a particulate filter (PF). The OC removes (e.g., combusts) hydrocarbons and/or carbon oxides from the exhaust. The dosing agent injector injects a dosing agent into the exhaust stream at a location between the OC and the SCR catalyst. The SCR catalyst absorbs ammonia (NH3) provided by the dosing agent, and the NH3 reacts with NOx in the exhaust.

SUMMARY

A dosing control system for a vehicle includes a pump control module and an enabling/disabling module. The pump control module controls a pump that provides dosing agent to a dosing agent injector located upstream of a selective catalytic reduction (SCR) catalyst in an exhaust system. The enabling/disabling module disables the pump for a predetermined melting period after engine startup when the dosing agent is frozen and selectively activates the pump during the predetermined melting period to cool the dosing agent injector when a tip temperature of the dosing agent injector is greater than a predetermined temperature.

A dosing control method for a vehicle includes controlling a pump that provides dosing agent to a dosing agent injector located upstream of a selective catalytic reduction (SCR) catalyst in an exhaust system, disabling the pump for a predetermined melting period after engine startup when the dosing agent is frozen, and selectively activating the pump during the predetermined melting period and cooling the dosing agent injector when a tip temperature of the dosing agent injector is greater than a predetermined temperature.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

Figure 1:
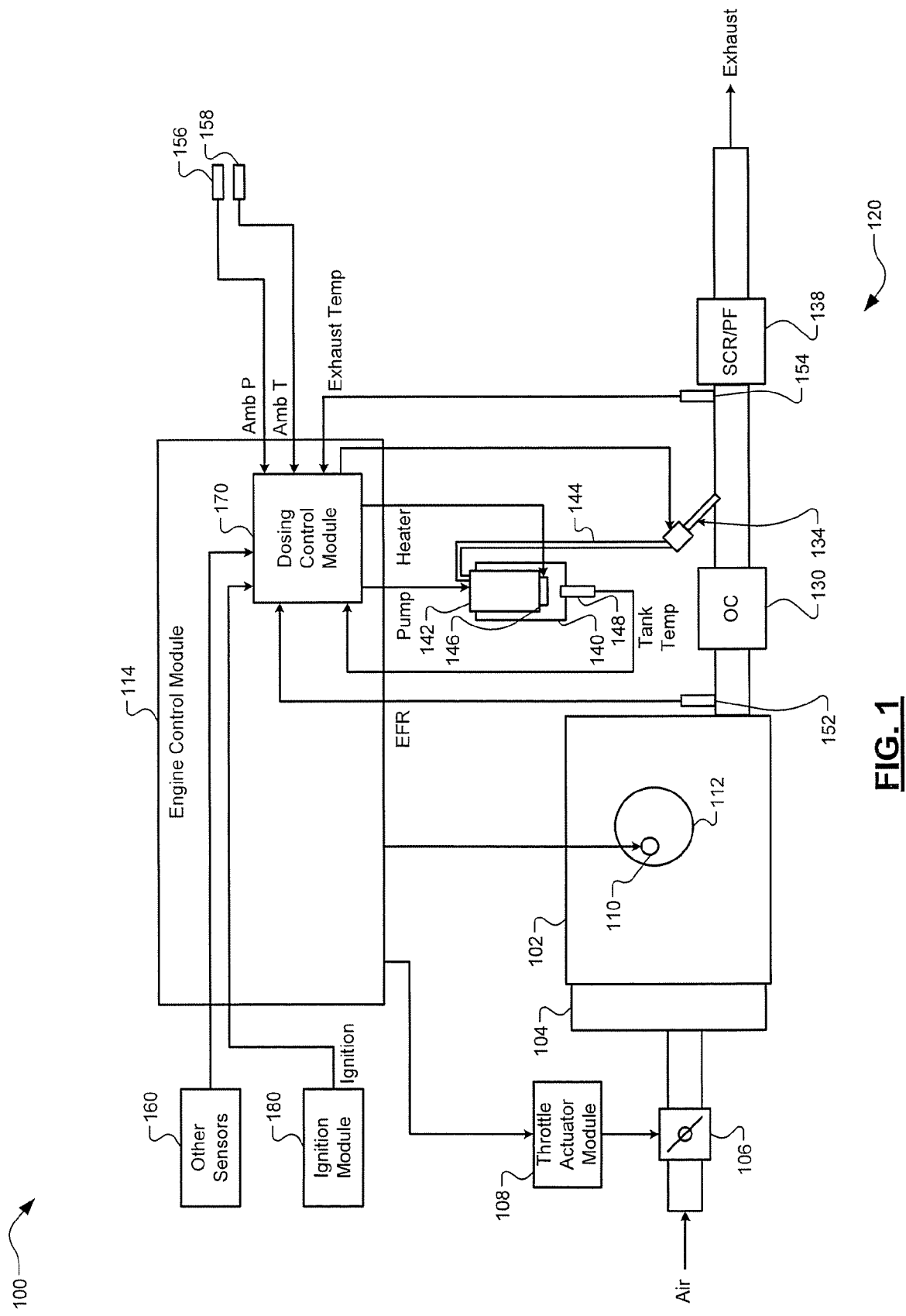
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Injection of a dosing agent into an exhaust system may be controlled during normal engine operation to, for example, maximize a conversion efficiency of a selective catalytic reduction (SCR) catalyst and minimize ammonia (NH3) slip. The conversion efficiency of the SCR catalyst refers to a percentage of nitrogen oxides (NOx) removed from exhaust via reaction with NH3. NH3 slip occurs when, for example, NH3 is present downstream of the SCR catalyst.

The dosing agent may freeze at temperatures less than a freezing point temperature of the dosing agent. For example only, the freezing point temperature may be approximately −11° C. Regeneration of a particulate filter may be performed during a predetermined melting period of frozen dosing agent, when dosing agent injection is generally not performed. For example only, the predetermined melting period may include approximately 70 minutes of engine runtime after an engine startup.

In some circumstances, dosing agent injection may be initiated during the regeneration to cool the dosing agent injector. A dosing control module of the present disclosure monitors the injection of dosing agent during the regeneration of the PF. After the regeneration has completed, the dosing control module selectively limits future injection of dosing agent based on the injection during the regeneration.

Referring now to FIG. 1, a functional block diagram of an exemplary engine system 100 is presented. An engine 102 combusts an air/fuel mixture to generate drive torque. While the engine 102 will be discussed as a diesel-type engine, the engine 102 may include a gasoline-type engine, a hybrid-type engine, and/or another suitable type of engine.

Air is drawn into the engine 102 through an intake manifold 104. A throttle valve 106 controls airflow into the engine 102. A throttle actuator module 108 controls opening of the throttle valve 106. For example only, the throttle actuator module 108 may include an electronic throttle controller (ETC). The air mixes with fuel injected by one or more fuel injectors, such as fuel injector 110. The air/fuel mixture is combusted within one or more cylinders of the engine 102, such as cylinder 112. Combustion of the air/fuel mixture generates torque. An engine control module (ECM) 114 controls the torque output of the engine 102.

Exhaust resulting from the combustion of the air/fuel mixture is expelled from the engine 102 to an exhaust system 120. The exhaust includes particulate matter (PM) and exhaust gas. The exhaust gas includes nitrogen oxides (NOx), such as nitrogen monoxide (NO) and nitrogen dioxide ($NO_2$). The PM may include hydrocarbons and carbon oxides. The exhaust system 120 includes a treatment system that reduces the amounts of NOx and PM in the exhaust.

The treatment system includes an oxidation catalyst (OC) 130, a dosing agent injector 134, and a selective catalytic reduction (SCR) catalyst and particulate filter (PF) 138. For example only, the OC 130 may include a diesel oxidation catalyst (DOC), and the PF may include a diesel particulate filter (DPF). Although the SCR catalyst and PF 138 are shown in FIG. 1 as being implemented within a common housing, the SCR catalyst and the PF may be implemented independently of each other.

The exhaust flows from the engine 102 to the OC 130. The OC 130 removes (e.g., combusts) hydrocarbons and/or carbon oxides from the exhaust. The dosing agent injector 134 injects a dosing agent into the exhaust stream at a location between the OC 130 and the SCR catalyst. For example only, the dosing agent may include urea, ammonia, or another suitable dosing agent that provides ammonia (hereafter "NH3"). A tip of the dosing agent injector 134 may extend into the exhaust system 120.

The PF filters PM from the exhaust, and PM filtered from the exhaust collects within the PF. PM is periodically cleared from the PF through a process referred to as regeneration, which is discussed further below. The SCR catalyst stores (i.e., absorbs) NH3 supplied by injected dosing agent. An exemplary chemical equation that is illustrative of NH3 absorption by the SCR catalyst is provided below.

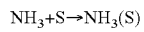

$$NH_3 + S \rightarrow NH_3(S)$$

The SCR catalyst catalyzes a reaction between the stored NH3 and NOx in the exhaust. For example only, the SCR catalyst may include a vanadium catalyst and/or a zeolite catalyst. In some implementations, the dosing agent may be diluted with, for example, water. In such implementations, heat from the exhaust may cause the water to evaporate, thereby resulting in the provision of NH3 to the SCR catalyst. An exemplary chemical equation that is illustrative of the production of NH3 from a dosing agent solution is provided below.

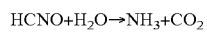

$$HCNO + H_2O \rightarrow NH_3 + CO_2$$

The dosing agent is stored in a tank 140 prior to being provided to the dosing agent injector 134. A pump 142 draws the dosing agent from the tank 140 and pressurizes the dosing agent in a connecting line 144. Pressurized dosing agent is delivered to the dosing agent injector 134 via the connecting line 144. A heater 146 warms the dosing agent stored within in the tank 140. The heater 146 may include, for example, a resistive heater.

In some implementations, temperature of the heater 146 may be self regulated. For example only, resistance of the heater 146 may change as the heater temperature changes to regulate the heater temperature at approximately a predetermined melting temperature. In some implementations, the heater temperature may be regulated by a module, such as the ECM 114 as shown in the exemplary embodiment of FIG. 1. The ECM 114 may control the heater temperature by controlling application of power to the heater 146 using a heater signal.

Various sensors may be implemented throughout the engine system 100. For example only, a tank temperature sensor 148 measures a temperature within the tank 140 (i.e., a tank temperature). An exhaust flow rate (EFR) sensor 152 measures a mass flow rate of the exhaust output by the engine 102. The mass flow rate of the exhaust may be referred to as the exhaust flow rate (EFR).

An exhaust temperature sensor 154 measures an exhaust temperature at a location between the OC 130 and the PF. Ambient pressure and temperature sensors 156 and 158 measure pressure (Amb P) and temperature (Amb T) of ambient air, respectively. The engine system 100 may also include other sensors 160, such as a temperature sensor upstream of the OC 130, a temperature sensor downstream of the PF, oxygen sensors, a NOx sensor downstream of the PF, and other suitable sensors. The other sensors 160 may additionally or alternatively include a manifold absolute pressure (MAP) sensor, a mass air flow (MAF) sensor, a throttle position sensor (TPS), an intake air temperature (IAT) sensor, and/or other sensor(s).

A dosing control module 170 controls the mass flow rate at which the dosing agent is injected by the dosing agent injector 134 (e.g., g/s). The dosing control module 170 may control the injection of dosing agent to maximize the percentage of NOx that is removed from the exhaust via reaction with NH3 during normal operation. The dosing control module 170 also controls the injection of dosing agent to minimize NH3 slip. NH3 slip occurs when NH3 is present downstream of the SCR catalyst. For example only, NH3 slip may occur when more NH3 is supplied to the SCR catalyst than the SCR catalyst is capable of storing.

The dosing agent stored within the tank 140 may freeze at temperatures less than a freezing point temperature of the dosing agent. For example only, the freezing point temperature of the dosing agent may be approximately −11° C. An ignition module 180 provides ignition signals to the dosing control module 170 according to user inputs via an ignition actuator module (not shown). For example only, the ignition actuator module may generate engine startup and engine shutdown commands based on user inputs to an ignition system.

A limited amount of liquid dosing agent may be present in the tank 140 when the tank temperature is less than the freezing point temperature upon and shortly after an engine startup. Drawing dosing agent from the tank 140 before the frozen dosing agent melts into to liquid may cause a cavity to form in the frozen dosing agent within the tank 140. As liquid dosing agent may be an effective heat transfer medium between the heater 146 and frozen dosing agent, removal of liquid dosing agent may slow the melting process of the frozen dosing agent.

Thus, dosing agent injection is generally not performed during a predetermined period after an engine startup when the tank temperature is less than the freezing point temperature. This predetermined period may be referred to as a melting period. For example only, the melting period may be set based on guidance from one or more governmental bodies and may include approximately 70 minutes of engine runtime.

During the melting period, however, regeneration of the PF may be performed. Regeneration of the PF includes combustion of PM trapped within the PF. Combustion of trapped PM may be accomplished at high temperatures, such as greater than approximately 600° C. Hydrocarbons (e.g., fuel) may be provided to the OC 130 to initiate regeneration of the PF and may be provided to the OC 130 for the regeneration. The OC 130 combusts the hydrocarbons, the combustion produces heat, and the heat is carried by the exhaust downstream to the PF.

As the dosing agent injector 134 is located downstream of the OC 130, however, the tip of the dosing agent injector 134 also receives heat from the OC 130. In some instances, this heat may cause the temperature of the tip of the dosing agent injector 134 to exceed a boiling point temperature of the dosing agent. For example only, the boiling point temperature of the dosing agent may be less than approximately 120° C. The dosing agent may turn acidic at temperatures greater than the boiling point temperature, and the acid may damage the dosing agent injector 134 and render the dosing agent ineffective for reaction with NOx.

The dosing control module 170 may activate the pump 142 during the melting period to provide pressurized dosing agent to the dosing agent injector 134. The provision of cooler dosing agent to the dosing agent injector 134 and injection of the dosing agent may cool the tip of the dosing agent injector 134. More specifically, heat from the tip of the dosing agent injector 134 may be transferred from the dosing agent injector 134 to the dosing agent.

The dosing control module 170 of the present disclosure tracks a total amount (e.g., g) of dosing agent injected during regeneration of the PF that occurs during the melting period. After the regeneration has completed or after the melting period has elapsed, the dosing control module 170 selectively limits the injection of dosing agent based on the total amount injected during the regeneration. In this manner, the dosing control module 170 saves liquid dosing agent that may otherwise be injected. This saving of liquid dosing agent ensures that liquid dosing agent is present within the tank 140 for melting of frozen dosing agent remaining in the tank 140.

Figure 2:
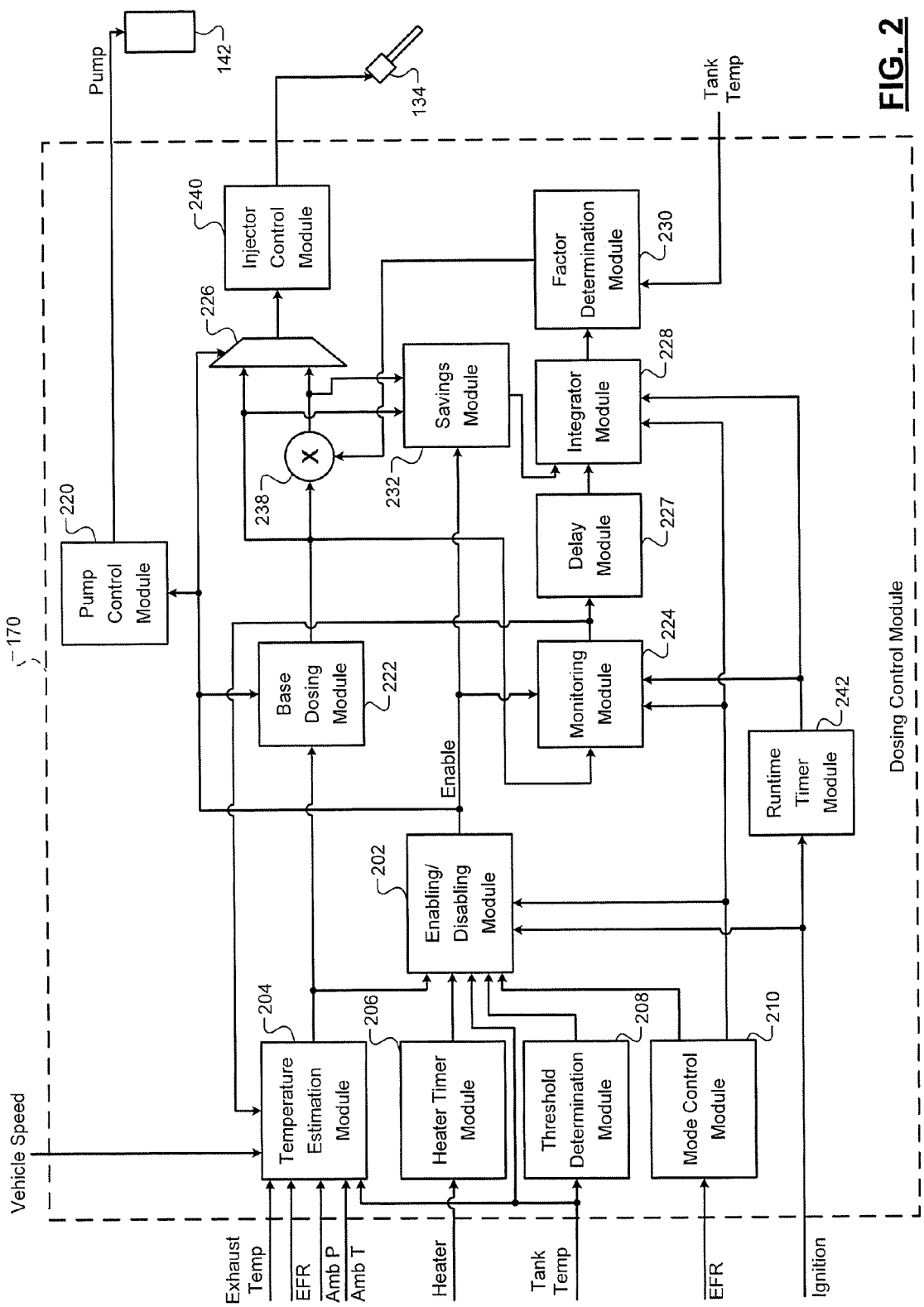
FIG. 2 is a functional block diagram of an exemplary dosing control module according to the principles of the present disclosure.

Referring now to FIG. 2, a functional block diagram of an exemplary implementation of the dosing control module 170 is presented. The dosing control module 170 includes an enabling/disabling module 202, a temperature estimation module 204, a heater timer module 206, and a threshold determination module 208. The dosing control module 170 further includes a mode control module 210, a pump control module 220, a base dosing module 222, a monitoring module 224, and a selection module 226. The dosing control module 170 further includes a delay module 227, an integrator module 228, a factor determination module 230, a savings module 232, a dosing reduction module 238, and an injector control module 240.

The enabling/disabling module 202 selectively enables and disables the injection of dosing agent. The enabling/disabling module 202 enables and disables the injection of dosing agent by controlling a state of an enable signal. The state of the enable signal may include, for example, an active state (e.g., 5 V) and an inactive state (e.g., 0 V).

The enabling/disabling module 202 disables the injection of dosing agent when the dosing agent is frozen upon engine startup. The enabling/disabling module 202 may determine whether the dosing agent is frozen based on a comparison of the tank temperature with the freezing point temperature. When the dosing agent is frozen, the enabling/disabling module 202 may maintain the disablement of the injection of dosing agent for the predetermined melting period.

While the injection of dosing agent is disabled during the predetermined melting period, the enabling/disabling module 202 selectively enables the injection of dosing agent during the predetermined melting period. The enabling/disabling module 202 may enable the injection of dosing agent during the predetermined melting period, for example, based on: (1) a comparison of an estimated temperature of the tip of the dosing agent injector (i.e., a tip temperature) and a predetermined temperature; and (2) a comparison of how long the heater 146 has been warming since the engine startup (i.e., a heater on period).

For example only, the enabling/disabling module 202 sets the enable signal to active when the tip temperature is greater than the predetermined temperature and the heater on period is greater than the predetermined heater on period. The predetermined temperature may be calibratable and may be set based on the boiling point temperature of the dosing agent. For example only, the predetermined temperature may be less than approximately 120° C. The enabling/disabling module 202 may enable the injection of dosing agent during the predetermined melting period further based on whether a regeneration mode is active. For example only, the enabling/disabling module 202 may enable the injection of the dosing agent during the predetermined melting period when the regeneration mode is active.

The temperature estimation module 204 estimates the tip temperature based on various parameters. For example only, the temperature estimation module 204 may estimate the tip temperature based on the exhaust temperature, the EFR, the ambient pressure, the ambient temperature, the tank temperature, and the vehicle speed. The temperature estimation module 204 may estimate the tip temperature further based on a total amount of dosing agent injected during the melting period.

The heater timer module 206 tracks the heater on period and provides the heater on period to the enabling/disabling module 202. The threshold determination module 208 determines the predetermined heater on period and provides the predetermined heater on period to the enabling/disabling module 202. For example only, the threshold determination module 208 may determine the predetermined heater on period based on the tank temperature.

The predetermined heater on period corresponds to a period of time after which a predetermined amount of liquid dosing agent will be present within the tank 140. This predetermined amount may include an amount of liquid dosing agent sufficient to fill the connecting line 144, to inject and cool the dosing agent injector 134 to below the predetermined temperature, and to maintain a desired amount of liquid dosing agent within the tank 140 for continued melting of frozen dosing agent.

The mode control module 210 controls the mode of operation for the dosing control module 170. The modes of operation may include, among other modes, a normal mode and a regeneration mode. The mode control module 210 may set the regeneration mode to active when regeneration is to occur and during regeneration. For example only, the mode control module 210 may maintain the regeneration mode as active while the OC 130 is providing heat for regeneration. In some implementations, the determination of whether regeneration of the PF should occur may be based on the EFR, change in pressure across the PF, and/or other suitable parameters.

As stated above, the enabling/disabling module 202 may set the enable signal to active when the tip temperature is greater than the predetermined temperature, the heater on period is greater than the predetermined heater on period, and the regeneration mode is active. The enabling/disabling module 202 may maintain the enable signal in the active state until the regeneration has been deemed successful or until an engine shutdown command is received.

The enabling/disabling module 202 may maintain the enable signal in the active state regardless of whether one or more of the enabling conditions cease being satisfied. When the engine shutdown command is received or when the regeneration has been deemed successful, the enabling/disabling module 202 may set the enable signal to the inactive state.

In some implementations, the mode control module 210 may determine and indicate whether the regeneration of the PF has been successful. For example only, the mode control module 210 may determine whether the regeneration has been successful based on the EFR, the change in pressure across the PF, and/or other suitable parameters.

The enabling/disabling module 202 provides the enable signal to the pump control module 220, the base dosing module 222, the monitoring module 224, and the selection module 226. The pump control module 220 activates the pump 142 when the enable signal is active. The pump 142 then draws liquid dosing agent from the tank 140 and provides the dosing agent to the dosing agent injector 134. Liquid dosing agent is then ready to be injected into the exhaust system 120.

The base dosing module 222 determines a base flow rate for dosing agent injection when the enable signal is active. The base flow rate corresponds to a mass flow rate of the liquid dosing agent that will likely cool the tip temperature to less than or equal to the predetermined temperature. For example only, the base dosing module 222 may determine the base flow rate based on the tip temperature. When the enable signal is later set to inactive, the base dosing module 222 may control the base flow rate, for example, to maximize the percentage of NOx that is removed from the exhaust via reaction with NH3 and minimize NH3 slip.

The base dosing module 222 provides the base flow rate to the selection module 226. The base flow rate is one of two inputs to the selection module 226. The other one of the two inputs to the selection module 226 is a limited flow rate, which is provided by the dosing reduction module 238. The dosing reduction module 238 and the limited flow rate are discussed further below.

The selection module 226 selects the base flow rate or the limited flow rate based on the state of the enable signal. For example only, the selection module 226 may select the base flow rate when the enable signal is active and may select the limited flow rate when the enable signal is inactive. In some implementations, the selection module 226 may include a two-to-one multiplexer as shown in the exemplary embodiment of FIG. 2. The selection module 226 may include other suitable types of selection devices.

The flow rate selected by the selection module 226 is provided to the injector control module 240. The injector control module 240 controls opening of the dosing agent injector 134 based on the selected flow rate. For example only, the injector control module 240 may determine a duty cycle of a signal applied to the dosing agent injector 134 based on the selected flow rate. The duty cycle may correspond to a percentage of a period of time that the dosing agent injector 134 is in a fully open position during the period.

The monitoring module 224 monitors the base flow rate when the enable signal is active and tracks a total amount (e.g., g) of the dosing agent that has been injected during the melting period. For example only, the monitoring module 224 may integrate the base flow rate over each predetermined interval (e.g., 100 ms) to determine an injected amount of the dosing agent (e.g., g). The monitoring module 224 may determine the total amount of dosing agent injected as a sum of the amounts determined over the predetermined intervals.

The monitoring module 224 may continue this accumulation of the total amount of dosing agent injected until, for example, the regeneration has been determined to be successful or until a runtime period exceeds the melting period. The transition of the enable signal from the active state to the inactive state may be used as the indicator of the success of the regeneration or the passing of the melting period. A runtime timer module 242 tracks the runtime period. The runtime period corresponds to how long the engine 102 has been running (i.e., combusting fuel) since engine startup.

The delay module 227 receives the total amount of the dosing agent injected from the monitoring module 224. The delay module 227 outputs a previous total amount stored in the delay module 227 and stores the total amount. Upon receiving of a next total amount, the delay module 227 outputs the total amount and stores the next total amount. The total amounts are output to the integrator module 228. For example only, the delay module 227 may include a one-bit, first-in-first-out (FIFO) buffer.

The integrator module 228 determines an integrated amount (e.g., g) of dosing agent and provides the integrated amount to the factor determination module 230. The integrator module 228 determines the integrated amount based on the total amount output by the delay module 227 and a saved amount of dosing agent. The saved amount is discussed further below.

The factor determination module 230 determines a limiting factor based on the integrated amount. The factor determination module 230 may determine the limiting factor further based on an initial tank temperature measured by the tank temperature sensor 148. The initial tank temperature may include a first tank temperature measured by the tank temperature sensor 148 after the engine startup. For example only, the limiting factor may include a value between 0.0 and 1.0. The limiting factors may be determined based on a mapping (e.g., lookup table) of limiting factors indexed by integrated amount. For example only, the limiting factors may approach 1.0 as the integrated amount approaches 0.0.

The dosing reduction module 238 receives the limiting factor from the factor determination module 230 and the base flow rate from the base dosing module 222. The dosing reduction module 238 determines the limited flow rate (e.g., g/s) based on the base flow rate and the limiting factor. For example only, the dosing reduction module 238 may determine the limited flow rate as a product of the base flow rate and the limiting factor as depicted in the exemplary embodiment of FIG. 2. In this manner, a limiting factor of 1.0 may correspond to zero limitation of the base flow rate (i.e., dosing agent injection at the base flow rate). The dosing reduction module 238 provides the limited flow rate to the selection module 226, and the selection module 226 selects one of the base flow rate and the limited flow rate for controlling dosing agent injection.

The savings module 232 determines an amount of liquid dosing agent saved during injection based on the limited flow rate. This amount of liquid dosing agent is referred to as the saved amount (e.g., g). For example only, the savings module 232 may determine the saved amount based on a flow rate difference between the base flow rate and the limited flow rate. The savings module 232 may integrate the flow rate difference over the predetermined intervals while the limited flow rate is selected and determine the saved amount similarly or identically to how the total amount is determined by the monitoring module 224.

The integrator module 228 determines the integrated amount based on the saved amount and the total amount provided by the savings module 232 and the delay module 227, respectively. More specifically, the integrator module 228 may determine the integrated amount based on a difference between the saved amount and the total amount. For example only, the integrator module 228 may output the integrated amount as the total amount less the saved amount.

In this manner, the saved amount increases as time passes while the limited flow rate is selected and used in controlling the mass flow rate of dosing agent injection. The integrated amount therefore decreases as while the limited flow rate is selected. When the integrated amount reaches zero, the limiting factor may be approximately 1.0. In this manner, the limitation imposed on the injection of dosing agent may be lifted once the saved amount reaches the total amount.

In other words, the injection of dosing agent may be limited until an amount of dosing agent equal the total amount has been saved through controlling the injection of dosing agent based on the limited flow rate. This limitation on the injection of dosing agent injected after the regeneration ensures that liquid dosing agent is retained within the tank 140 for further melting of frozen dosing agent.

Figure 3:
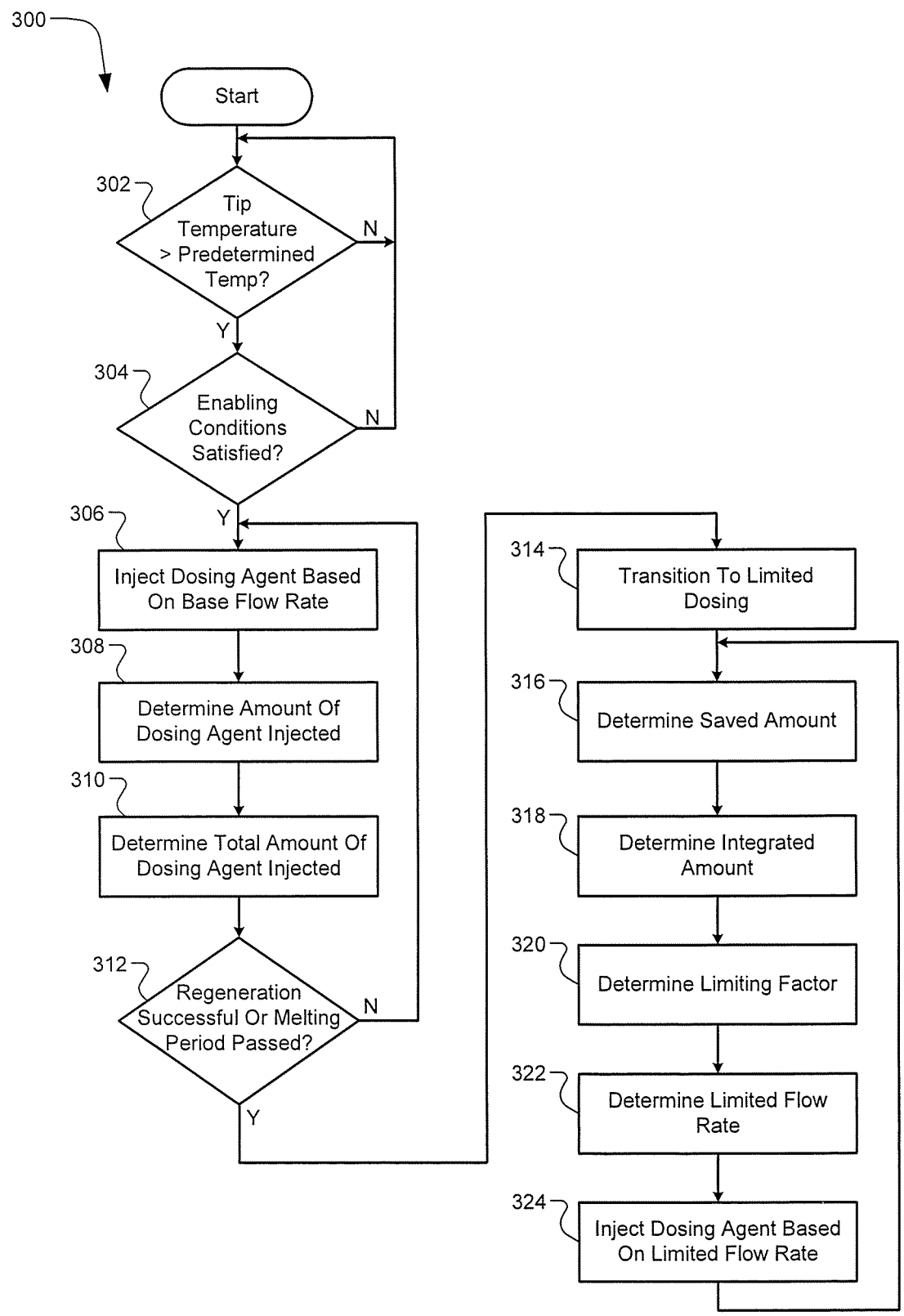
FIG. 3 is a flowchart depicting an exemplary method according to the principles of the present disclosure.

Referring now to FIG. 3, a flowchart depicting an exemplary method 300 is presented. Control may begin in step 302 during a regeneration of the PF that occurs within the melting period after an engine startup. In step 302, control determines whether the tip temperature is greater than the predetermined temperature. If true, control continues to step 304; if false, control remains in step 302. For example only, the predetermined temperature may be less than approximately 120° C.

Control determines whether the enabling conditions are satisfied in step 304. If true, control continues to step 306; if false, control returns to step 302. For example only, the enabling conditions may be satisfied when the tip temperature is greater than the predetermined temperature, the heater on period is greater than the predetermined heater on period, and the regeneration mode is active. Control injects the dosing agent based on the base flow rate in step 306. Control determines an amount of dosing agent injected in step 308. For example only, control may integrate the base flow rate over a period corresponding to one control loop to determine the amount in step 308.

Control determines the total amount of dosing agent injected in step 310. In step 312, control determines whether the regeneration has been deemed successful or whether the melting period has passed. If true, control continues to step 314; if false, control returns to step 306. Control transitions to limited dosing in step 314. In other words, control transitions to controlling the dosing agent injection based on the limited flow rate in step 314. The limited flow rate is less than the base flow rate and, therefore, dosing agent is saved during injection based on the limited flow rate.

In step 316, control determines the saved amount of dosing agent. Control proceeds to step 318 where control determines the integrated amount based on the total amount from step 310 and the saved amount from step 316. Control determines the limiting factor based on the integrated amount and the initial tank temperature in step 320. Control determines the limited flow rate in step 322 and controls injection of the dosing agent based on the limited flow rate in step 324. Control then returns to step 316.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A dosing control system for a vehicle, comprising:
   a first electronic circuit configured to control a pump that provides dosing agent to a dosing agent injector located upstream of a selective catalytic reduction (SCR) catalyst in an exhaust system; and
   a second electronic circuit configured to disable the pump for a predetermined melting period after engine startup when the dosing agent is frozen and selectively activate the pump during the predetermined melting period to cool the dosing agent injector when a tip temperature of the dosing agent injector is greater than a predetermined temperature.

2. The dosing control system of claim 1 wherein the second electronic circuit is configured to disable the pump when the tip temperature is greater than the predetermined temperature for more than a predetermined period.

3. The dosing control system of claim 1 further comprising a third electronic circuit configured to control injection of the dosing agent,
   wherein the second electronic circuit is configured to disable the injection of the dosing agent during the predetermined melting period when the dosing agent is frozen and selectively enable the injection of dosing agent during the predetermined melting period.

4. The dosing control system of claim 3 further comprising:
   a fourth electronic circuit configured to monitor an amount of dosing agent injected during a particulate filter regeneration that occurs during the predetermined melting period; and
   a fifth electronic circuit configured to selectively reduce the injection of dosing agent after the particulate filter regeneration based on the amount.

5. The dosing control system of claim 4 further comprising a sixth electronic circuit configured to determine a saved amount of dosing agent injected during the reduced injection,
   wherein the fifth electronic circuit is configured to selectively reduce the injection of the dosing agent further based on the saved amount.

6. The dosing control system of claim 5 wherein the fifth electronic circuit is configured to reduce the injection of dosing agent based on a difference between the amount and the saved amount.

7. The dosing control system of claim 4 wherein the fifth electronic circuit is configured to selectively reduce the injection of dosing agent further based on an initial temperature within a dosing agent tank measured when the dosing agent is frozen.

8. The dosing control system of claim 3 wherein the second electronic circuit is configured to selectively enable the injection of dosing agent based on the tip temperature.

9. The dosing control system of claim 8 wherein the second electronic circuit is configured to selectively enable the injection of dosing agent when the tip temperature is greater than a predetermined temperature.

10. The dosing control system of claim 1 further comprising a third electronic circuit configured to estimate the tip temperature based on an exhaust temperature measured between an oxidation catalyst and a particulate filter, an exhaust flow rate, and an amount of dosing agent injected.

11. The dosing control system of claim 1 wherein the first and second electronic circuits include at least one of an Application Specific Integrated Circuit (ASIC), a processor and memory including one or more programs, and a combinational logic circuit.

12. A dosing control method for a vehicle, comprising:
controlling a pump that provides dosing agent to a dosing agent injector located upstream of a selective catalytic reduction (SCR) catalyst in an exhaust system;
disabling the pump for a predetermined melting period after engine startup when the dosing agent is frozen; and
selectively activating the pump during the predetermined melting period and cooling the dosing agent injector when a tip temperature of the dosing agent injector is greater than a predetermined temperature.

13. The dosing control method of claim 12 further comprising disabling the pump when the tip temperature is greater than the predetermined temperature for more than a predetermined period.

14. The dosing control method of claim 12 further comprising:
controlling injection of the dosing agent;
disabling the injection of the dosing agent during the predetermined melting period when the dosing agent is frozen; and
selectively injecting dosing agent during the predetermined melting period.

15. The dosing control method of claim 14 further comprising:
monitoring an amount of dosing agent injected during a particulate filter regeneration that occurs during the predetermined melting period; and
selectively reducing the injection of dosing agent after the particulate filter regeneration based on the amount.

16. The dosing control method of claim 15 further comprising:
determining a saved amount of dosing agent injected during the reduced injection; and
selectively reducing the injection of the dosing agent further based on the saved amount.

17. The dosing control method of claim 16 further comprising reducing the injection of dosing agent based on a difference between the amount and the saved amount.

18. The dosing control method of claim 15 further comprising selectively reducing the injection of dosing agent further based on an initial temperature within a dosing agent tank measured when the dosing agent is frozen.

19. The dosing control method of claim 14 further comprising selectively enabling the injection of dosing agent based on the tip temperature.

20. The dosing control method of claim 19 further comprising injecting the dosing agent when the tip temperature is greater than a predetermined temperature.

21. The dosing control method of claim 12 further comprising estimating the tip temperature based on an exhaust temperature measured between an oxidation catalyst and a particulate filter, an exhaust flow rate, and an amount of dosing agent injected.

* * * * *